United States Patent [19]

Burgoyne, Jr. et al.

[11] Patent Number: 5,369,185
[45] Date of Patent: Nov. 29, 1994

[54] MULTIPLE ACETAL CONTAINING RESINS

[75] Inventors: William F. Burgoyne, Jr., Allentown; Jeremiah P. Casey, Emmaus; Thomas A. Manuel; Joel E. Goldstein, both of Allentown, all of Pa.

[73] Assignee: Air Products and Chemicals, Inc., Allentown, Pa.

[21] Appl. No.: 172,470

[22] Filed: Dec. 23, 1993

Related U.S. Application Data

[63] Continuation-in-part of Ser. No. 77,696, Jun. 15, 1993, Pat. No. 5,298,567.

[51] Int. Cl.$^5$ .................................................. C08F 8/32
[52] U.S. Cl. ............................. 525/327.6; 525/329.6; 525/367; 525/369; 525/379
[58] Field of Search ........................... 525/327.6, 329.6

[56] References Cited

U.S. PATENT DOCUMENTS

| | | | |
|---|---|---|---|
| 4,663,410 | 5/1987 | Pinschmidt, Jr. et al. | 526/263 |
| 4,691,026 | 9/1987 | Pinschmidt, Jr. et al. | 548/531 |
| 4,788,288 | 11/1988 | Pinschmidt, Jr. et al. | 544/212 |
| 4,864,055 | 9/1989 | Pinschmidt, Jr. et al. | 560/160 |

*Primary Examiner*—Bernard Lipman
*Attorney, Agent, or Firm*—Mark L. Rodgers; William F. Marsh

[57] ABSTRACT

Resins which comprise polymers which contain multiple acetal groups have been developed which are useful for crosslinking and adhesion promotion in coating and adhesive applications. The polymers which make up these resins are prepared by the addition of aminoacetals to polymers containing anhydride functionality. The polymers are modified by titration with a tertiary amine or alkali base.

6 Claims, No Drawings

MULTIPLE ACETAL CONTAINING RESINS

CROSS REFERENCE TO RELATED APPLICATION

This is a continuation-in-part of U.S. application Ser. No. 08/077,696 filed Jun. 15, 1998,now U.S. Pat. No. 5,298,567, the subject matter of which is hereby incorporated by reference.

TECHNICAL FIELD OF THE INVENTION

The present invention relates to alternatives to the use of formaldehyde based crosslinking agents in coating and adhesive applications.

BACKGROUND OF THE INVENTION

Emulsion and solution polymers find wide application as adhesives, binders and coatings. Unfortunately, many of these polymeric materials, especially those prepared predominantly from vinyl acetate, ethylene, vinyl chloride, or their mixtures, show inadequate resistance to water and other solvents in their everyday use. In particular, they experience substantial and unacceptable loss in strength in the presence of solvents such as perchloroethylene, methyl ethyl ketone and toluene. In addition, many of these polymers exhibit deficiencies in adhesion to the substrates on which they are used, for example vinyl acetate, ethylene or vinyl chloride polymers on glass, metal or polyester. These deficiencies are reduced, especially for relatively hydrophilic monomers, by the use of adhesion promoting or crosslinking comonomers and/or post-added crosslinkers.

Among types of widely used crosslinking materials are arninoplasts, especially N-methylolacrylamide and urea-formaldehyde or melamine-formaldehyde condensates. These materials have met substantial success because they are low in cost, highly compatible with aqueous emulsion systems, rapidly cured under acid catalysis, and substrate reactive in that, for example, they react with the hydroxyl groups of cellulosic materials. These crosslinking materials, however, suffer from two deficiencies: (1) the emission of low levels of formaldehyde during cure and subsequent use, and (2) inadequate adhesion to certain substrates, for example, metal, glass and polyester.

Many attempts have been made to overcome or minimize the first deficiency, especially after the potential carcinogenicity and irritant properties of formaldehyde became widely recognized.

To reduce the level of formaldehyde in emulsion products, the use of O-alkylated N-methylolacrylamides such as butoxymethylacrylamide or the use of about equimolar ratios of N-methylolacrylamide with acrylamide were introduced. These materials did not, however, totally eliminate the presence of formaldehyde.

U.S. Pat. Nos. 4,691,026, 4,663,410, 4,788,288 and 4,864,055 disclose self- and hydroxyl reactive formaldehyde fee cyclic hemiamidal and hemiamide ketal monomers and polymers formed from such monomers. The monomers can be incorporated into free radical addition polymers which undergo efficient acid catalyzed, thermally activated post-crosslinking with themselves or, alternatively, can react with active hydrogen-containing comonomers of the polymers and/or with groups on the substrate to which the polymer is applied. These materials were advantageous over prior crosslinking systems in that they provided for good crosslinking and adhesion promotion without the accompanying emission of formaldehyde.

SUMMARY OF THE INVENTION

Resins which comprise polymers containing multiple acetal groups have been developed which are useful for crosslinking and adhesion promotion in coating and adhesive applications. These resins allow for formaldehyde-free crosslinking which makes them advantageous over the aminoplast systems of the prior art. Additionally, these resins are advantageous over prior art formaldehyde-free systems in that they are compatible with water-based coating systems and can be incorporated into the aqueous phase of an emulsion coating system. The polymers which make up these resins are prepared by the addition of aminoacetals to polymers containing anhydride functionality and can be represented by the general structural formula:

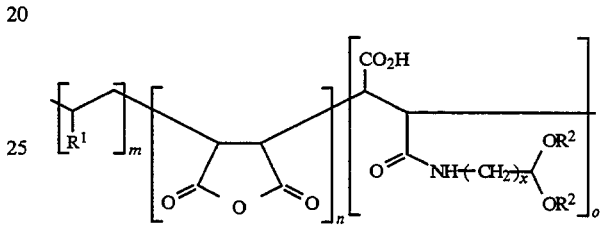

wherein $R^1$ is aryl, $C_1$–$C_{20}$ alkyl, $C_1$–$C_8$ alkoxy, acetate, halide, or ester; $R^2$ is a $C_1$–$C_6$ alkyl group; x is from 1 to 6; m is from 0.05 to 0.95; n is from 0.00 to 0.25; and o is from 0.10 to 0.80.

Optionally, these polymers may be modified by titration with a tertiary amine or alkali base which solublizes the polymer in aqueous systems which have been found to be relatively stable at room temperature without undergoing uncontrolled, self-crosslinking reactions.

DETAILED DESCRIPTION OF THE INVENTION

The present invention is a class of resins which are useful for crosslinking and adhesion promotion in coating and adhesive applications. The resins comprise one or more polymers which have members represented by the structural formula (I):

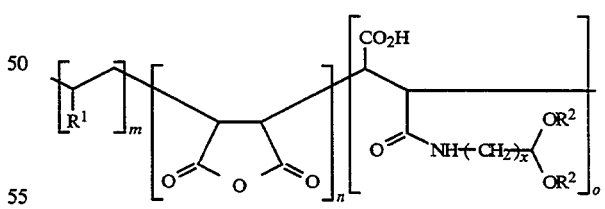

wherein $R^1$ is aryl, $C_1$–$C_2O$ alkyl, $C_1$–$C_8$ alkoxy, acetate, halide, or ester; $R^2$ is a $C_1$–$C_6$ alkyl group; x is from 1 to 6; m is from 0.05 to 0.95; n is from 0.00 to 0.25; and O is from 0.10 to 0.80.

These polymers can be prepared by addition of aminoacetals to a polymer containing anhydride functionality. The degree of amination of the polymers is controlled by the amount of anhydride present in the polymer.

The carboxylic acid moiety formed as a result of the amination of the anhydride provides a convenient handle for solubilizing the polymer in aqueous systems by titrating the polymer with a base such as sodium hydroxide, ammonia, or an amine. For example, the addition of an amine represented by the formula $(R^3)_2NH$ wherein each $R^3$ is independently H, $C_1$-$C_6$ alkyl or hydroxyalkyl, or $\omega,\omega$-dialkoxyalkyl to the polymer of formula I above affords the corresponding ammonium salt in quantitative yield. The resulting polymers after complete titration can be represented by the following structural formula (II):

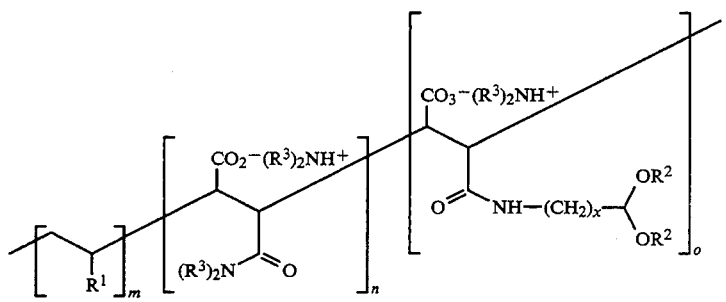

Maleic anhydride copolymers which have been completely aminated with the aminoacetal (n=0.00) can be titrated with either tertiary amines or alkali bases.

The tertiary amines used for titration can be represented by the structural formula $(R^3)_3N$ wherein each $R^3$ is independently $C_1$-$C_6$ alkyl or hydroxyalkyl. The resultant polymer can be represented by the following structural formula (III):

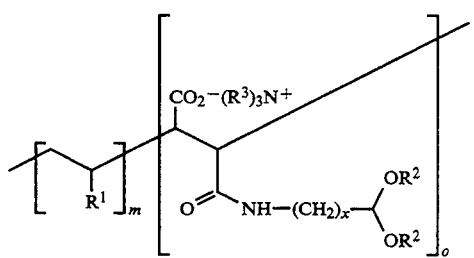

Alkali bases used for titration are those represented by the chemical formula $M^+OH^-$ wherein $M^+$ is selected from the group consisting of $Li^+$, $Na^+$ and $K^+$. The polymers which result from titration with these alkali bases can be represented by the structural formula (IV):

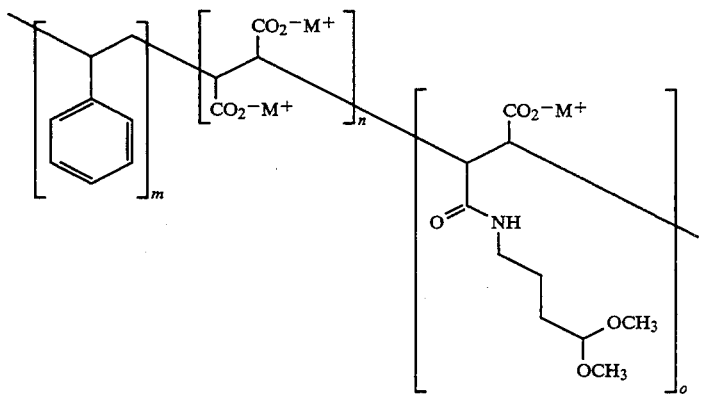

Resins comprising these polymers provide for formaldehyde-free crosslinking systems. Additionally, resins comprising polymers represented by structural formulas II, III and IV are compatible with water-based coating systems and can be incorporated into the aqueous phase of an emulsion coating system. Such aqueous solutions have been found to be relatively stable; i.e., 4 to 5 weeks, at room temperature without undergoing uncontrolled, self-crosslinking reactions.

The following examples illustrate this invention and are not intended to limit its scope.

EXAMPLE 1

Amination of Styrene/Maleic Anhydride Copolymer with 4,4-Dimethoxybutylamine

A 30.00 g portion of a styrene/maleic anhydride copolymer (1:1 molar ratio of styrene to maleic anhydride; Mw=5,600, Mn=1,800; 0.153 mol of anhydride functionality) was dissolved in 300 g of tetrahydrofuran contained in a 500 mL round-bottomed flask. With magnetic stirring, 20.37 g (0.153 mol) of 4,4-dimethoxybutylamine was added over 30 min. The solution was then heated to reflux for 5 hr. After which time, the solvent was removed via evaporation under reduced pressure and the residual yellowish-white product was dried in vacuo (30° C., 0.02 mm Hg) overnight. Infrared spectroscopy of the polymer (KBr pellet) revealed no anhydride functionality in the polymer, but the spectrum possessed a band at 1715 cm$^{-1}$ (carboxylic acid stretch) and at 1640 cm$^{-1}$ (amide stretch). The isolated polymer had a mass of 48.40 g and had the composition listed in Table 1.

EXAMPLES 2-12

Amination of Styrene/Maleic Anhydride Copolymer with 4,4-Dimethoxybutylamine

The procedure described in Example 1 was repeated with styrene/maleic anhydride copolymers of differing composition and molecular weight and with differing amounts of 4,4-dimethoxybutylamine addition. Infrared spectroscopy of the polymers prepared revealed bands at 1780 cm$^{-1}$ (anhydride stretch), at 1715 cm$^{-1}$ (carboxylic acid stretch) and at 1640 cm$^{-1}$ (amide stretch) in intensities relative to the respective polymer composition. The properties of the polymers produced by these procedures are listed in Table 1.

TABLE 1

Oligomers Prepared from Amination of Styrene/Maleic Anhydride Copolymers with 4,4-Dimethoxybutylamine.

| Example No. | Starting Styrene/ Maleic Anhydride Oligomer | g of Oligomer (mol of Anhydride Functionality) | g (mol) of 4,4- Dimethoxy butyl amine | Isolated Mass (g) | Composition | | |
|---|---|---|---|---|---|---|---|
| | | | | | m | n | o |
| 1 | A | 30.00 (0.153) | 20.37 (0.153) | 48.40 | 0.50 | 0.00 | 0.50 |
| 2 | A | 30.00 (0.153) | 10.19 (0.0765) | 39.85 | 0.50 | 0.25 | 0.25 |
| 3 | A | 30.00 (0.153) | 5.10 (0.0383) | 36.57 | 0.50 | 0.37 | 0.13 |
| 4 | A | 30.00 (0.153) | 2.04 (0.0153) | 31.01 | 0.50 | 0.45 | 0.05 |
| 5 | B | 30.00 (0.102) | 13.58 (0.102) | 42.21 | 0.67 | 0.00 | 0.33 |
| 6 | B | 30.00 (0.012) | 6.79 (0.0510) | 36.34 | 0.66 | 0.17 | 0.17 |
| 7 | B | 30.00 (0.102) | 3.40 (0.0255) | 32.73 | 0.67 | 0.25 | 0.08 |
| 8 | B | 30.00 (0.102) | 1.36 (0.0102) | 30.00 | 0.67 | 0.30 | 0.03 |
| 9 | C | 30.00 (0.0765) | 10.19 (0.0765) | 39.97 | 0.75 | 0.00 | 0.25 |
| 10 | C | 30.00 (0.0765) | 5.09 (0.0382) | 37.21 | 0.75 | 0.12 | 0.12 |
| 11 | C | 30.00 (0.0765) | 2.54 (0.0191) | 31.21 | 0.75 | 0.19 | 0.06 |
| 12 | C | 30.00 (0.0765) | 1.02 (0.0077) | 31.68 | 0.75 | 0.23 | 0.02 |

Starting oligomers were obtained from Atochem, Inc.:
(A) SMA1000 - 1:1 styrene/maleic anhydride molar ratio;
Mw = 5,600; Mn = 1,600; Tg = 138° C.
(B) SMA2000 - 2:1 styrene/maleic anhydride molar ratio;
Mw = 7,700; Mn = 1,700; Tg = 124° C.
(C) SMA3000 - 3:1 styrene/maleic anhydride molar ratio;
Mw = 10,300; Mn = 1,900; Tg = 124° C.

EXAMPLE 13

Amination of Methyl Vinyl Ether/Maleic Anhydride Copolymer with 4-4-Dimethoxybutylamine A 50.00 g portion of a methyl vinyl ether/maleic anhydride copolymer (1:1 molar ratio of methyl vinyl ether to maleic anhydride; Gantrez AN-119; Mw=20,000; 0.3202 mol of anhydride functionality) was aminated with 42.65 g (0.3202 mol) of 4,4-dimethoxybutylamine in 1400 mL of THF according to the procedure described in Example 1. Infrared spectroscopy of the polymer (KBr pellet) revealed no anhydride functionality in the polymer, but the spectrum possessed a band at 1730 cm$^{-1}$ (carboxylic acid stretch) and at 1650 cm$^{-1}$ (amide stretch). The isolated polymer had a mass of 96.06 g.

EXAMPLE 14

Amination of Vinyl Acetate/Maleic Anhydride Copolymer with 4,4-Dimethoxybutylamine A 20.00 g portion of a vinyl acetate/maleic anhydride copolymer (0.9115:0.0885 molar ratio of vinyl acetate to maleic anhydride; Dajac-91 84; 0.0204 mol of anhydride functionality) was aminated with 2.71 7 g (0.0204 mol) of 4,4-dimethoxybutylamine in 45 mL of THF according to the procedure described in Example 1. Infrared spectroscopy of the polymer (KBr pellet) revealed no anhydride functionality in the polymer, but the spectrum possessed a band at 1740 cm$^{-1}$ (carboxylic acid stretch) and at 1650 cm$^{-1}$ (amide stretch). The isolated polymer had a mass of 15.37 g.

EXAMPLE 15

Amination of 1-Octadecene/Maleic Anhydride Copolymer with 4,4-Dimethoxybutylamine A 25.00 g portion of a 1-octadecene/maleic anhydride copolymer (1:1 molar ratio of 1-octadecene to maleic anhydride; Chevron PA-18; Mw=35,000; 0.071 3 mol of anhydride functionality) was aminated with 9.50 g (0.071 3 mol) of 4,4-dimethoxybutylamine in 500 mL of THF according to the procedure described in Example 1. Infrared spectroscopy of the polymer (KBr pellet) revealed no anhydride functionality in the polymer, but the spectra possessed a band at 1720 cm$^{-1}$ (carboxylic acid stretch) and at 1 640 cm$^{-1}$ (amide stretch). The isolated polymer had a mass of 34.57 g.

EXAMPLES 16–22

Neutralization of Styrene/Maleic Anhydride/N-(4,4-Dimethoxybutyl)maleamic Acid Terpolymers with Aqueous Sodium Hydroxide A 100 g portion of a styrene/maleic anhydride/N-(4,4-dimethoxybutyl)maleamic acid terpolymer was added to an aqueous solution of sodium hydroxide with vigorous stirring as indicated in Table 2. The mixture was then mildly heated up to a maximum of 80° C. until the resin completely dissolved. After which time, the solution was cooled. This procedure afforded stable, aqueous solutions without precipitate formation due to premature crosslinking. The starting terpolymer was that of Formula I above wherein $R^1$ is phenyl, both $R^2$ groups are methyl, x is 3 and m, n, and o are as set out below.

TABLE 2

Neutralization with Aqueous Sodium Hydroxide.

| Example | g (mol of acid) of SMA/ABAA Adduct (a) | mol of NaOH added | Composition | | | % Solids in water | Sol. pH |
|---|---|---|---|---|---|---|---|
| | | | m | n | o | | |
| 16 | 100 (0.426) | 0.426 | 0.50 | 0.08 | 0.42 | 40 | 13.0 |
| 17 | 100 (0.441) | 0.441 | 0.50 | 0.15 | 0.35 | 40 | 13.1 |
| 18 | 100 (0.497) | 0.497 | 0.50 | 0.20 | 0.30 | 40 | 13.1 |
| 19 | 100 (0.558) | 0.558 | 0.50 | 0.25 | 0.25 | 40 | 13.9 |
| 20 | 100 (0.627) | 0.627 | 0.50 | 0.30 | 0.20 | 40 | 14.0 |
| 21 | 100 (0.735) | 0.735 | 0.50 | 0.37 | 0.13 | 40 | 13.9 |
| 22 | 100 (0.990) | 0.990 | 0.50 | 0.50 | 0.00 | 40 | 13.8 |

(a) Based on 2 mol of acid form 1 mol of anhydride.

EXAMPLE 23

Neutralization of Styrene/N-(4,4-Dimethoxybutyl)-maleamic Acid Copolymer with Triethylamine A 25 g portion of a styrene/N-(4,4-dimethoxybutyl)-maleamic acid copolymer was added to a solution of triethylamine in water with vigorous stirring. The mixture was then mildly heated up to a maximum of 80° C. until the resin completely dissolved. After which time, the solution was cooled. This procedure afforded a stable, aqueous solution without precipitate formation due to premature crosslinking.

EXAMPLES 24–31

Reaction of Acetal Containing Oligomers with Pentaerythritol

An aqueous suspension of the oligomer prepared in Example 1 was completely titrated with 28% aqueous ammonium hydroxide to provide an aqueous solution (30% solids) of the oligomer with 1.00 equivalent of the carboxylic acid groups converted to their ammonium salts. This aqueous oligomer solution was then combined with aqueous pentaerythritol and para-toluenesulfonic acid monohydrate (p-TSA) according to the amounts presented in Table 3.

TABLE 3

Composition of Aqueous Solutions of Oligomer, Pentaerythritol, and para-Toluenesulfonic Acid.

| Example No. | g of Aqueous Oligomer Sol'n | mmol of Acetal Functionality | g of 10% Aqueous Pentaerythritol | mmol of Hydroxyl Functionality | g of p-TSA |
|---|---|---|---|---|---|
| 24 | 10.0 | 8.76 | 10.0 | 7.34 | — |
| 25 | 10.0 | 8.76 | 10.0 | 7.34 | 0.10 |
| 26 | 10.0 | 8.76 | 10.0 | 7.34 | — |
| 27 | 8.67 | 7.59 | 8.67 | 6.37 | 0.10 |

The aqueous solutions of Examples 24 and 25 were maintained at room temperature while the aqueous solutions of Examples 26 and 27 were maintained at 75° C. overnight. After which time, Examples 24 and 25 maintained their clear, colorless appearance while Examples 26 and 27 were yellowish solutions with the presence of minor amounts of precipitate. The solutions of Examples 24 and 25 were then cast as thin films on mylar sheets and permitted to air dry overnight. Portions of each film were then heated to 100° C. in an air convection oven overnight. After which, the films were then placed in water (0.25 g of film in 10 g of water), agitated, and the properties recorded as noted in Table 4.

TABLE 4

Properties of Untreated and Treated Films.

| Example No. | Film Prepared from Example No. | Film Heat Treated to 100° C. | Film Properties after Re-exposure to Water |
|---|---|---|---|
| 28 | 24 | no | Dissolved rapidly in water; afforded a clear colorless solution. |
| 29 | 24 | yes | Very minor solubility in water; yellowish, brittle film. |
| 30 | 25 | no | Dissolved rapidly in water; afforded a clear colorless solution. |
| 31 | 25 | yes | No solubility in water; yellowish, brittle film; no evidence of swelling. |

Examples 24–31 illustrate that aqueous solutions of the acetal containing oligomers can be prepared by base titration of the carboxylic acid moiety, and that these aqueous solutions are relatively stable at room temperature. At higher temperatures, these solutions begin to undergo acetal exchange reactions in solution. The thermal treatment of films of these oligomers and pentaerythritol, with or without the presence of additional acid, also affords acetal exchange reactions. This is reflected in the formation of crosslinks in the oligomer and the lack of water solubility.

EXAMPLE 32

Crosslinking Polyvinyl Alcohol with the Acetal Containing Oligomers

An aqueous suspension of the oligomer prepared in Example 1 was partially titrated with 28% aqueous ammonium hydroxide to provide an aqueous solution (30% solids) of the oligomer with 0.50 equivalent of the carboxylic acid groups converted to their ammonium salts. A 3.27 g portion of the aqueous oligomer solution (2.80 mmol of acetal functionality) was added to an aqueous solution of 2.00 g (45.40 mmol of hydroxyl functionality) of polyvinyl alcohol (Airvol 325, 98–98.8% hydrolyzed, Mw=85,000–146,000) in 18.00 g of water then mixed thoroughly. The resultant aqueous solution was cast as a thin film on a mylar sheet and allowed to air dry at room temperature overnight. The film was found to be clear and flexible and readily (20 min) redissolved in water with minor agitation. A portion of the film was heated in an air oven at 90° C. for 3 hrs. After which time, the heat treated film was found to be clear and brittle. After placing in water (100 mg of heat treated film in 10 g of water) and agitating overnight, the heat treated film swelled but did not dissolve.

This example illustrates the utility of these acetal containing oligomers as crosslinking agents for water-based systems.

EXAMPLE 33

Application of Aqueous Resins in Binding Non-Woven Cellulose Fiber

The copolymer portion of Example 1 was diluted with water to form a 20% solids solution. The solution was then back-titrated with 18% aqueous hydrochloric acid in order to reduce the pH to 5.8. This procedure resulted in the formation of a resin solution with only a portion of the carboxylic acid moieties neutralized. However, the resin still maintained complete water solublity. A 0.5 g sample of this solution was then applied to a pre-weighed, 7 cm circle of Whatman #1 filter paper and dried for 20 min. at 149° C. The dried filter paper was then sealed in an air-tight bag and stored at constant temperature (25° C.) and humidity overnight. The treated Whatman #1 filter paper was compared against the untreated Whatman filter paper for water absorbancy on a GATS apparatus. Results showed that an improvement in Water Capacity of 3.84 g of water per g of resin was realized with an Absorbancy Under Load (AUL) of 1.83 g of water per g of paper.

EXAMPLE 34

Coatings Utility of ABAA Maleamides Waterborne Coatings

The control formulation was an elevated temperature cure amino crosslinking system containing Cargill water reducible oil-free polyester 72-7289 buffered with dimethylethanolamine. Cymel 303 from American Cyanamid was the hexamethoxymethylmelamine crosslinker. This gloss white baking enamel is usually formulated with ~40% titanium dioxide pigment, but was made pigment-free for these application studies.

To prepare a nominal 80/20 resin/melamine curative coating, 10.67 g Cargill 72-7289 resin, containing 8.00 g of resin solids, was well mixed with 0.54 g dimethylethanolamine, 6.79 g of deionized distilled water and 2.0 g Cymel 303. For effective wetting, leveling and flow control ~50 mg of 3M's FC-430 FLUORAD fluoroaliphatic polymeric ester was added and well mixed. The coating formulation was spread onto a 4"×12" 22 gauge unpolished cold-rolled steel test panel which had been wiped down with 1/1 methyl ethyl ketone/toluene to remove the last traces of oils. A Bird type film applicator with nickel-chrome finish was used to generate a 3" wide by 0.0015" thick wet film. For a final film of ~1 mil, a 3 mil drawdown bar was used for this 50% solids in water mixture. The plate was allowed to stand 10 minutes in a fume hood, then placed in a vented, forced air convection oven at 177° C. for 10 minutes.

Coatings Physical Property Data

Film hardness by pencil test was done following ASTM D 3363-74. Adhesion by tape test was measured according to ASTM D 3359-87, method B, with 1 mm grid spacing. Reverse impact data expressed in inch-pounds were generated using method ASTM D 2794-84. The indenter steel punch hemispheric head was ⅜ inch.

Standard Polyester-Melamine Waterborne Coatings

Coating 1 prepared from mixing 10.67 g Cargill 72-7289 polyester resin with 0.54 g dimethylethanolamine, 6.79 g deionized distilled water and 2.00 g Cymel 303 hexamethoxymethylmelamine was tested as noted above; tabulated data summarize critical parameters:

| Coating | Resin % | Melamine % | Curative % | Solids % | 10 min. cure (°F.) | Thickness (mil) | Pencil Hardness | Scratch Adhesion | Reverse Impact |
|---|---|---|---|---|---|---|---|---|---|
| 1 | 80.0 | 20.0 | 0 | 50.0 | 350 | 0.95 | 4H | 5 | 130 |

Coatings Using Formaldehyde-free Oligomeric Curative

An aqueous suspension of the oligomer prepared in Example 1 was titrated completely with triethylamine to provide an aqueous solution (39% solids) of the oligomer with 1.00 equivalent of the carboxylic acid groups converted to their triethylammonium salts. This was used to replace hexamethoxymethylmelamine on a 1:1 dry weight solids basis. A test resin formulation was made with a quarter of the melamine withdrawn and replaced by the styrene maleamide curative; the components were 10.67 g Cargill 72-7289 polyester resin with 0.54 g dimethylethanolamine, 6.01 g deionized distilled water, 6.40 g of the 30% styrene maleamide oligomer in water and 1.50 g Cymel 303 hexamethoxymethylmelamine (Coating 2). Also made was a coating with 50% of the melamine withdrawn and replaced by an equal weight of dialkyl acetal amide oligomer (Coating 3).

| Coating | Resin % | Melamine % | Curative % | Solids % | 10 min. cure (°F.) | Thickness (mil) | Pencil Hardness | Scratch Adhesion | Reverse Impact |
|---|---|---|---|---|---|---|---|---|---|
| 2 | 80.0 | 15.0 | 5.0 | 50.0 | 350 | 0.90 | 2H | 5 | 160 |
| 3 | 80.0 | 10.0 | 10.0 | 50.0 | 350 | 0.85 | 2H | 5 | 150 |

In another series of tests, an aqueous suspension of the oligomer prepared in Example 1 was titrated completely with aqueous ammonia to provide an aqueous solution (30 % solids) of the oligomer with 1.00 equivalent of the carboxylic acid groups converted to their ammonium salts. Again a control resin formulation was made, approximately duplicating the mix ratios of Coating 1, then a total replacement of melamine crosslinker was attempted in Coating 5.

| Coating | Resin % | Melamine % | Curative % | Solids % | 10 min. cure (°F.) | Thickness (mil) | Pencil Hardness | Scratch Adhesion | Reverse Impact |
|---|---|---|---|---|---|---|---|---|---|
| 4 | 80.0 | 20.0 | 0 | 50.0 | 350 | 1.25 | 3H | 5 | 170 |

| Coat- ing | Resin % | Melamine % | Curative % | Solids % | 10 min. cure (°F.) | Thickness (mil) | Pencil Hardness | Scratch Adhesion | Reverse Impact |
|---|---|---|---|---|---|---|---|---|---|
| 5 | 80.0 | 0 | 20.0 | 50.0 | 350 | 1.25 | 2H | 4 | 240 |

Replacement of hexafunctional melamine with polyfunctional formaldehyde-free oligomer led to increased reverse impact strength with only slightly lower hardness and reduced scratch adhesion. This total replacement of formaldehyde-generating crosslinker with formaldehyde-free oligomer which is also multifunctional generated, overall, unexpectedly equivalent coating physical properties.

The ability of the styrene maleic anhydride oligomer reacted with aminobutryaldehyde dimethyl acetal and neutralized with ammonia to self crosslink was demonstrated by simply drawing down, using ~50 mg FC-430 for 4.0 g of 30% solution, then thermally curing the oligomer (Coating 6). The low reverse impact resistance is indicative of a high degree of brittleness, consistent with overly efficient crosslinking.

zation appears to lie between entries 8 and 10. With more complete dilution by resin the physical property benefits of carboxylic acid-induced crosslinking are reduced due to limited crosslinking sites in the SMA resin which initially contained only 25% maleic anhydride.

Having thus described the present invention, what is now deemed appropriate for Letters Patent is set out in the following appended claims.

What is claimed is:

1. A resin useful for crosslinking and adhesion promotion in coating and adhesive applications which resin comprises a polymer having members of the structural formula:

| Coat- ing | Resin % | Melamine % | Curative % | Solids % | 10 min. cure (°F.). | Thickness (mil) | Pencil Hardness | Scratch Adhesion | Reverse Impact |
|---|---|---|---|---|---|---|---|---|---|
| 6 | 0 | 0 | 100 | 30.0 | 350 | 0.90 | 3H | 3 | <1 |

High Solids Solvent Coatings

Addition products of aminobutyraldehyde dimethyl acetal (ABAA) to styrene/maleic anhydride (SMA) copolymers dissolved in tetrahydrofuran could be obtained as stable solids by evaporation of the reaction solvent. The acid amide product could then be redissolved in methoxy propanol acetate at ~50% solids for formulation with polyester polyol resin to test crosslinkability. In one experiment an SMA/ABAA adduct from addition of ABAA equivalent to the maleic anhydride content in a 75/25 styrene/maleic anhydride resin was mixed in various proportions with Aroplaz 6755-A6-80 polyester provided by Reichhold Chemicals, Inc. Aroplaz 6755-A6-80 resin is mixed with 13% by weight methoxy propanol acetate (Arcosolv PM acetate, CAS #108-65-6) and 7% by weight toluene (CAS#108-88-3). Dilution with PM acetate solvent allowed film formation starting at the same solids level for all formulations. No external acid catalyst was added as the coatings were flash evaporated in a hood after drawdown, then cured for 20 minutes at 177° C.

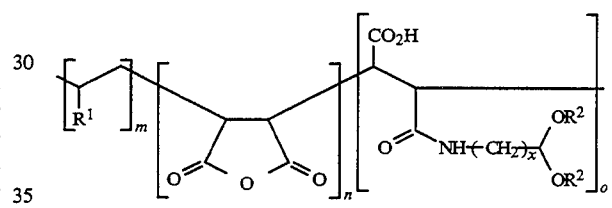

wherein $R^1$ is alkyl, $C_1$-$C_2O$ alkyl, $C_1$-$C_8$ alkoxy, acetate, halide, or ester; $R^2$ is a $C_1$-$C_6$ alkyl group; X is from 1 to 6; m is from 0.05 to 0.95; n is from 0.00 to 0.25; and o is from 0.10 to 0.80; which polymer has been titrated with a tertiary amine or an alkali base.

2. The resin of claim 1 wherein said tertiary amine is represented by the chemical formula $(R^3)_3N$ wherein each $R^3$ is independently $C_1$-$C_6$ alkyl or hydroxyalkyl group.

3. The resin of claim 1 wherein said alkali base is represented by the chemical formula $M+OH^{31}$ wherein $M^+$ is selected from the group consisting of $Li^+$, $Na^+$, and $K^+$.

4. The resin of claim 2 wherein said polymer has the

| Coat- ing | Resin wt % | SMA/ABAA wt % | Solids (%) | Thickness (mils) | Pencil Hardness | Scratch Adhesion | MEK double rubs |
|---|---|---|---|---|---|---|---|
| 7 | 0 | 100 | 33.3 | .80 | H | 4 | >200 |
| 8 | 10 | 90 | 35.1 | .90 | H | 5 | >200 |
| 9 | 20 | 80 | 35.1 | .85 | H | 5 | 190 |
| 10 | 30 | 70 | 35.0 | .85 | H | 5 | 130 |
| 11 | 40 | 60 | 35.2 | .80 | H | 4 | 50 |
| 12 | 50 | 50 | 35.0 | .85 | H | 3 | 30 |
| 13 | 60 | 40 | 35.1 | .85 | H | 2 | 15 |
| 14 | 70 | 30 | 35.0 | .85 | F | 3 | 10 |

The greatest crosslink density, as measured by methyl ethyl ketone (MEK) double rubs, is from self-crosslinking of the SMA/ABAA oligomer, crosslinking induced solely by the oligomer's carboxylic acid group catalytic effect, for no external acid such as para-toluenesulfonic acid was added. Upon dilution with resin the scratch adhesion improves, so that a balance of property optimiformula wherein n is 0.00.

5. The resin of claim 4 wherein said resultant polymer after titration has units of the structural formula:

13
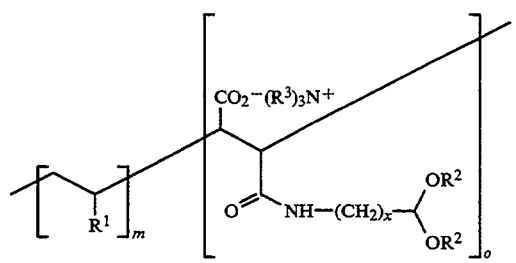
6. The resin of claim 3 wherein said resultant polymer after titration has units of the structural formula:
14
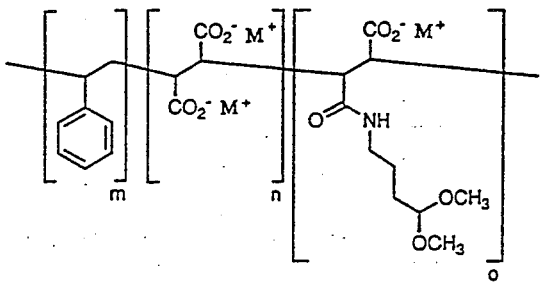
* * * * *

UNITED STATES PATENT AND TRADEMARK OFFICE
CERTIFICATE OF CORRECTION

PATENT NO. : 5,369,185

DATED : November 29, 1994

INVENTOR(S) : Burgoyne, Jr. et al

It is certified that error appears in the above-identified patent and that said Letters Patent is hereby corrected as shown below:

Column 12, Line 37
    Delete the word "alkyl" and replace it with --aryl--

Column 12, Line 47
    Delete "M+OH$^{31}$" and replace it with --M$^+$OH$^-$--

Signed and Sealed this

Thirty-first Day of January, 1995

Attest:

BRUCE LEHMAN

*Attesting Officer*     *Commissioner of Patents and Trademarks*